(12) United States Patent
Schuk

(10) Patent No.: US 8,659,414 B1
(45) Date of Patent: Feb. 25, 2014

(54) WIRELESS OBJECT-PROXIMITY MONITORING AND ALARM SYSTEM

(76) Inventor: Chad Schuk, Orlando, FL (US)

(*) Notice: Subject to any disclaimer, the term of this patent is extended or adjusted under 35 U.S.C. 154(b) by 234 days.

(21) Appl. No.: 13/328,649

(22) Filed: Dec. 16, 2011

Related U.S. Application Data

(60) Provisional application No. 61/425,936, filed on Dec. 22, 2010.

(51) Int. Cl.
*B60Q 1/00* (2006.01)
*G08B 23/00* (2006.01)

(52) U.S. Cl.
USPC ............... 340/457; 340/457.1; 340/573.1; 340/573.4; 340/687; 307/9.1; 307/10.1

(58) Field of Classification Search
USPC ............. 340/457, 457.1, 573.1, 573.4, 687, 340/539.1, 539.15, 521, 522, 584, 686.1, 340/425.5; 307/9.1, 10.1; 180/268, 270
See application file for complete search history.

(56) References Cited

U.S. PATENT DOCUMENTS

| | | | | |
|---|---|---|---|---|
| 6,909,365 | B2* | 6/2005 | Toles | 340/457 |
| 7,466,217 | B1* | 12/2008 | Johnson et al. | 340/425.5 |
| 2001/0030607 | A1 | 10/2001 | Osborne et al. | |
| 2002/0005783 | A1 | 1/2002 | Irizarry et al. | |
| 2002/0101351 | A1 | 8/2002 | Lochner | |
| 2003/0011478 | A1 | 1/2003 | Rabanne et al. | |
| 2004/0046658 | A1 | 3/2004 | Turner et al. | |
| 2004/0080420 | A1 | 4/2004 | Roberts | |
| 2004/0095252 | A1* | 5/2004 | Kraljic et al. | 340/687 |
| 2005/0003477 | A1 | 1/2005 | Kandel et al. | |
| 2005/0040956 | A1 | 2/2005 | Allen et al. | |
| 2005/0181743 | A1 | 8/2005 | Lawson | |
| 2005/0280546 | A1 | 12/2005 | Ganley et al. | |
| 2006/0250255 | A1 | 11/2006 | Flanagan | |
| 2007/0018812 | A1 | 1/2007 | Allen et al. | |
| 2007/0069891 | A1 | 3/2007 | Wallace et al. | |
| 2007/0200716 | A1 | 8/2007 | Haase et al. | |
| 2008/0055072 | A1 | 3/2008 | Holoyda | |
| 2009/0079557 | A1* | 3/2009 | Miner | 340/457.1 |
| 2010/0117821 | A1 | 5/2010 | Cruz | |
| 2010/0164712 | A1 | 7/2010 | Corrigan | |

* cited by examiner

*Primary Examiner* — Anh V La
(74) *Attorney, Agent, or Firm* — H. John Rizvi; Gold & Rizvi, P.A.

(57) ABSTRACT

A wireless child proximity monitoring and alarm system for use with child seats for vehicles includes a separable seat monitor for affixation to the seat's shoulder straps. The seat monitor has a first housing affixable to one of the shoulder straps and a second housing affixable to a second shoulder strap. The second housing has a transceiver for wireless communication and a microcontroller integrated with the transceiver. A micro switch is communicative with the microcontroller and is responsive to the proximity of the first housing. A connecting strap extends between the housings and is separable from at least one housing. A key fob for retention by a child caregiver has a fob case and a transceiver therein for wireless communication with the seat monitor transceiver. A microcontroller is integrated with the transceiver, and an alarm is selectively operable between a first silent sate and a second audible alarm generating state.

20 Claims, 7 Drawing Sheets

WIRELESS OBJECT-PROXIMITY MONITORING AND ALARM SYSTEM

CROSS-REFERENCE TO RELATED APPLICATION

This Non-Provisional Utility application claims the benefit of U.S. Provisional Patent Application Ser. No. 61/425,936, filed on Dec. 22, 2010, which is incorporated herein in its entirety.

FIELD OF THE INVENTION

The present invention relates generally to a seat belt monitoring and alarm system and method of use thereof, wherein the system is activated when the key fob is separated by a predefined distance from a the car to alert the driver that a child is still inside the car. The invention is more particularly directed to a wireless object-proximity monitoring and alarm system that is inserted between the buckles of the child seat and monitors the various connections to ensure that it is installed and the child is seated in the safety seat.

BACKGROUND OF THE INVENTION

During the last ten years, the number of children that died because their parents forgot them unattended in the backseat of a car is dramatically increasing. Parents are becoming forgetful about their children, often unintentionally leaving them unattended in vehicles, sometimes during hot weather.

In the past 10 years, more than 400 heat-related deaths in children have been reported. All these children have died after overheating in hot cars. Thirty to forty children die in hot cars every year, and all the deaths were preventable. Eighteen percent of the children died after the parents unintentionally left them in a car, and 30% died after climbing into cars to play.

Parents should never leave children unattended in a car, because temperatures inside can rise quickly. Opening windows has almost no effect, because much of the heat radiates off seats and dashboards. Although rear-facing car seats have saved countless lives, their hoods can also cover babies completely, making them less visible to drivers.

Slightly more than half of the deaths occurred because the parents forgot that the children-many of them less than one-year old were asleep in the back. About half of those deaths occur when babies are with parents who do not usually drive them. Those parents appear to slip back into their usual routine, as if on autopilot.

Vehicles are usually locked with the windows rolled up, even in hot weather, thereby potentially causing severe distress, injury, and/or death of a child left therein. In addition to injuries, children left alone in an otherwise unoccupied vehicle are potentially subject to kidnapping. With the need for multitasking, wherein many different needs are being addressed, and the consequent strain on a parent or caregiver to remember a child in the backseat while being busy and stressed, some form of reminding device would be advantageous.

There are several devices in the prior art for addressing this problem. For example, there is a seat belt restraint and alarm system, comprising electronic circuitry within an automobile key. Once the seatbelt is buckled, an alarm beyond a selected distance from a vehicle will result in the activation of an alarm advising a parent or other caregiver that a child is still secured within the vehicle. A vehicle transmitter/receiver senses the presence or absence of a circuit component or a signal from the key-borne device and if absent, signals back to sound the alarm.

Another known device comprises a weight-sensitive mat or another sensor to determine whether a child seat in a vehicle is occupied. It includes a transmitter and a key fob or another portable unit includes a receiver and an alarm. Generally, if the child seat is occupied and the key fob is removed from proximity to the transmitter. The transmitter communicates this to the key fob receiver, and the alarm is activated.

Even though the above cited alarm system of the prior art addresses some of the needs of the market, an affordable and reliable wireless object-proximity monitoring and alarm system is still desired, that is inserted between the buckles of the child seat and monitors the various connections to ensure that it is installed and the child is seated in the safety seat is still desired.

SUMMARY OF THE INVENTION

This invention is directed to a wireless object-proximity monitoring and alarm system that is capable of being inserted between the buckles of the child seat and monitors the various connections to ensure that it is installed and the child is seated in the safety seat.

In one general aspect of the present invention, a wireless object-proximity monitoring and alarm system comprises affordable and reliable electronic circuitry capable of sensing the presence of a child seated in his/her seat and emitting a radio signal to a key fob to alert the child caregiver if a predetermined distance has been reached from the place the child is seated.

A further aspect of the present invention is related to a wireless object-proximity monitoring and alarm system; including an adapter capable of being engaged with the child seat seatbelt buckles and including radio frequency transmission circuitry to connect it to a key fob which includes radio frequency receptor circuitry with an audible alarm connected thereto. The buckle adapter is inserted between the buckle elements of the child seat and is capable of monitoring the various connections to ensure that it is installed and the child is seated in the safety seat.

Accordingly, it is a primary object of the present invention to provide a wireless object-proximity monitoring and alarm system that can then be transferred between seats and easily removed if desired.

Another aspect of the present invention provides a wireless object-proximity monitoring and alarm system including a proximity sensor to indicate if the child is in the seat.

Also another aspect of this invention comprises a wireless object-proximity monitoring and alarm system that may also include a heat verification device to ensure that a living being is seated in the child seat.

Yet another aspect provides a wireless object-proximity monitoring and alarm system, which has the capacity of alerting a child caregiver that a child has been left unattended and strapped into a seat belt or child seat within the interior of the car.

Still another aspect of the present invention is its ability to create a warning alert to a driver that a predetermined distance from a vehicle has been reached with a child unattended therein.

Yet a further aspect of the present invention is a wireless child proximity monitoring and alarm system for use with child seats for vehicles wherein the child seat includes shoulder straps for restraining the child includes a separable seat monitor for affixation to the child seat shoulder straps. The seat monitor has a first housing affixable to one of the shoulder straps and a second housing affixable to a second shoulder strap. The second housing has a transceiver for wireless communication and a microcontroller integrated with the transceiver. A micro switch is communicative with the microcontroller and is responsive to the proximity of the first housing. A connecting strap extends between the first and second housings and is separable from at least one the housings. A key fob for retention by a child caregiver has a fob case and a transceiver therein for wireless communication with the seat monitor transceiver. A microcontroller is integrated with the transceiver, and an alarm is selectively operable between a first silent sate and a second audible alarm generating state.

Another aspect of the present invention is a wireless seat monitor for use with child seats for vehicles wherein the child seat includes shoulder straps for restraining the child. The seat monitor includes a first housing affixable to a first of the child seat shoulder straps and a second housing affixable to a second of the child seat shoulder straps. The second housing including a transceiver for wireless communication and a microcontroller integrated with the transceiver and further including a micro switch communicative with said microcontroller and responsive to the proximity of said first housing. A connecting strap extends between the first housing and the second housing wherein the connecting strap is separable from at least one of the housings.

Still another aspect of the present invention is a method of determining to trigger an alarm alerting a user that a child has been left unattended in a vehicle wherein the child is buckled in a child seat having affixed thereto a wireless seat monitor wherein the wireless seat monitor is of the type having a first housing affixed to a first of the child seat shoulder straps, a second housing affixed to a second of the child seat shoulder straps, the second housing having a transceiver for wireless communication a microcontroller executing a predefined instruction set and integrated with the transceiver, and further having a micro switch communicative with the microcontroller and responsive to the proximity of the first housing, and a connecting strap extending between the first housing and the second housing, wherein the connecting strap is separable from at least one of the first and second housings. The method steps include receiving from the micro switch a "connected" signal signifying that the connecting strap is engaged with both the first housing and the second housing and receiving from the vehicle at least one other parameter signifying that the vehicle is potentially unoccupied other than the child in the child seat. Then, triggering a sensory alarm when the "connected" signal and the vehicle parameter are both present.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, where like numerals denote like elements and in which.

Figure 1:
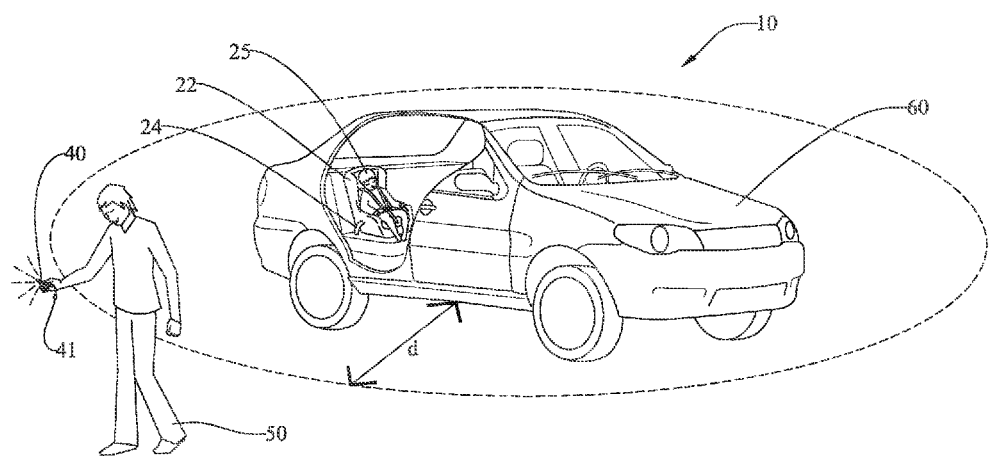
FIG. 1 presents a schematic perspective view of a wireless child proximity monitoring and alarm system embodying the present invention, showing a vehicle, a child seated in his/her seat and a child caregiver holding a key fob including the electronic circuitry with an audible alarm alerting the user that a predetermined distance has been reached.
Figure 2:
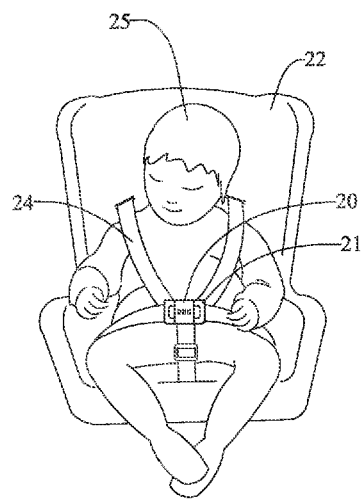
FIG. 2 presents a front view of a child seated in his/her seat with the seat belt engaged with the child seat seatbelt buckles wherein the system is activated.

These and other features, aspects, and advantages of the invention will be further understood and appreciated by those skilled in the art by reference to the following written specification, claims and appended drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown in FIGS. 1-4, a wireless object-proximity monitoring and alarm system 10 comprises two primary components: a monitoring device configured as a buckle adapter 20 capable of being inserted between the latches 21 of the child seat 22 and an alert device 40 inserted into a key fob 41.

A child car seat 22 includes restraining straps 23 for securing the child seat 22 to the car seat, and seat belts 24 for securing the child 25 to the child seat 22. The seat belt 24 in turn includes a latch 21 and a latch plate 21' that snaps into the latch 21 when the child 25 is seated in the seat 22. The buckle adapter 20 may also include a latch component and a latch plate component to receive the original latch and latch plate 21-21' of seat belt 24.

Figure 3:
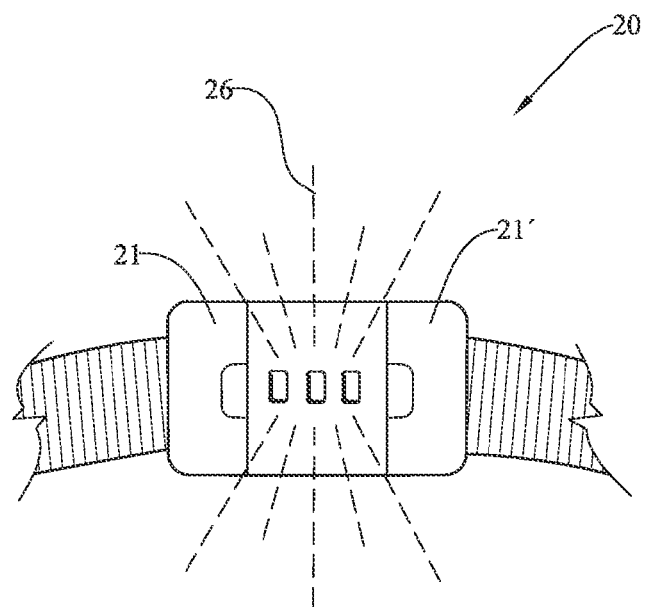
FIG. 3 presents an enlarged frontal view of the buckle adapter engaged with both elements of the child seat buckle.
Figure 4:
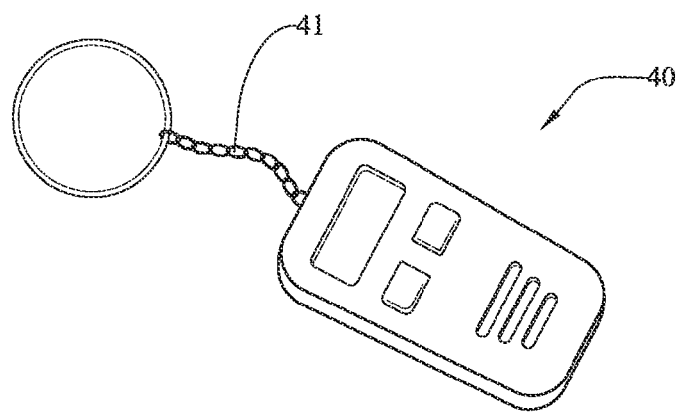
FIG. 4 presents a perspective view of a key fob including the electronic circuitry wirelessly communicative with the buckle adapter for alerting the user about the presence of an unattended child seated in the car seat.
Figure 5:
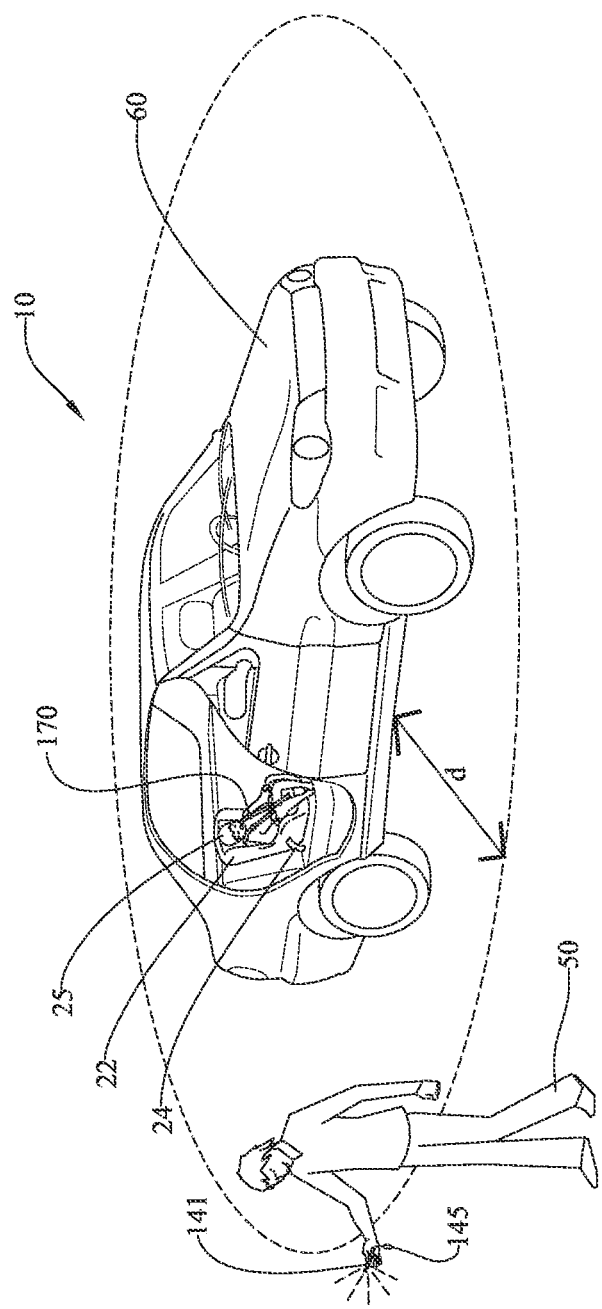
FIG. 5 presents a schematic perspective view of an alternate embodiment wireless child proximity monitoring and alarm system embodying the present invention for use with a child seat in a vehicle.
Figure 6:
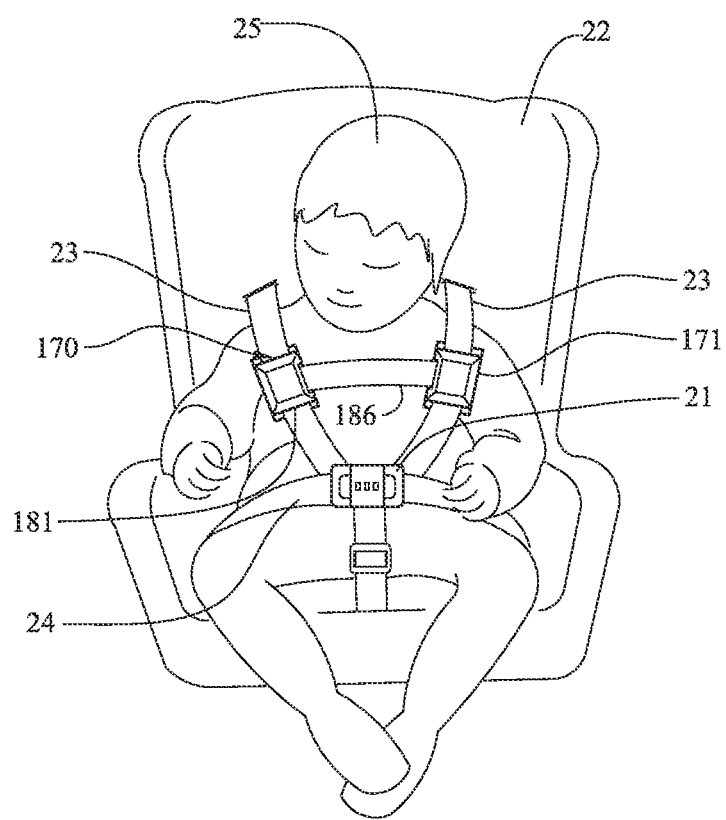
FIG. 6 presents a front view of a child seated in a vehicle child seat wherein a seat monitor is engaged with both shoulder straps.

As illustrated in FIG. 3, the buckle adapter 20 is inserted between the latch 21 and the latch plate 21' of the original seat belt 24 of the child seat 22, therefore every time the child is seated and the latch 21 and latch plate 2F are engaged with buckle adapter 20, the alert and monitoring system 10 is activated. The buckle adapter 20 may include a universal latch constructed to receive any type of latch plates.

The buckle adapter 20 includes an internal radio frequency transmission device capable of being activated when the latch plate 21' is engaged in buckle adapter 20 or may also be activated remotely by a child caregiver 50.

When the system 10 is activated, radio frequency waves 26 are emitted by the buckle adapter 20 which are detected or received by a radio frequency transceiver device 40 included within a key fob 41. Once the system 10 is activated, the monitoring function of the buckle adapter 20 is capable of sensing if a predetermined distance "D" has been reached between the buckle adapter 20 and the key fob 41. In such a case, an alarm signal will be emitted by the transceiver device 40 within the key fob 41 alerting the child caregiver 50 that the child is being left in the vehicle 60 unattended. The alert signal may include any suitable alarming device, such as, for example, a buzzer, speaker, vibrator, flashing tight or the like.

A situation in which a child 25 is seated in a car seat 22 in a vehicle 60 with the seat belt 24 engaged with buckle adapter 20 and therefore the system 10 activated is illustrated in FIG. 1. The child caregiver 50 has passed the redetermined distance "D" after which the alarm of the device 40 sounds.

The predetermined distance may be set at ten feet, or any other distance the manufacturer or the user may consider prudent to avoid an instance of leaving an unattended child 25.

The buckle adapter 20 is inserted between the latch 21 and latch plate 21' of seat belt 24 restraining the child seat 22 and monitors the various connections to ensure that it is installed and the child 25 is seated in the safety seat 22. In one possible embodiment, a backup device may be included, comprising a proximity sensor as part of the buckle adapter 20 to indicate if the child 25 is in the child seat 22.

In another embodiment, the adapter may also include a heat verification device to ensure that a living being is seated in the child seat, and not simply any other object.

Since a child seat 22 is often transferred from one vehicle to the other, the buckle adapter 20 can also be transferred between seats and easily removed if desired. Also, the system 10 may be used in school buses or any type of vehicle, including vehicles with special features for handicapped or elderly passengers.

In the particular case of a school bus, the system may include the ability of using only one key fob 41 for receiving the alert signals coming from any of the devices installed in the bus. A regular school bus has around forty to fifty seats. Therefore, if a buckle adapter 20 is installed in all or many of those seats, the driver may only require one key fob 41 capable of receiving the alert signal of any of the devices.

Buckle adapter 20 may also include an ON-OFF button to disable the system when it is not in use. It may be disabled when a child is not using the seat or when the key fob 41 is beyond the alarm tripping distance from the vehicle.

As illustrated in FIGS. 5-9 an alternate embodiment wireless child proximity monitoring and alarm system 110 is shown. The alarm system 110 includes a monitoring unit, which can be one or more of a wrist device 190 and a seat monitor 170. In general, the wrist device 190 and the seat monitor 170 transmit a "connect" message when enabled for reception by a key fob 141 carried by the child caregiver 50. The seat monitor is enabled when integrated with the restraining straps 23 on the child seat 22 while the child 25 is fully strapped into the child seat 22. The wrist device 190 is selectively enabled/disabled by the switch 196 (FIG. 9) as more fully described below. The key lob 141 continually 'listens' for the "connect" message and ensures that reception of the connect message is received until a "disconnected" message is received. If the key fob 141 fails to receive a set number of "connected" messages before receiving a "disconnected" message, the key fob 141 will sound an audible alarm.

Figure 7:
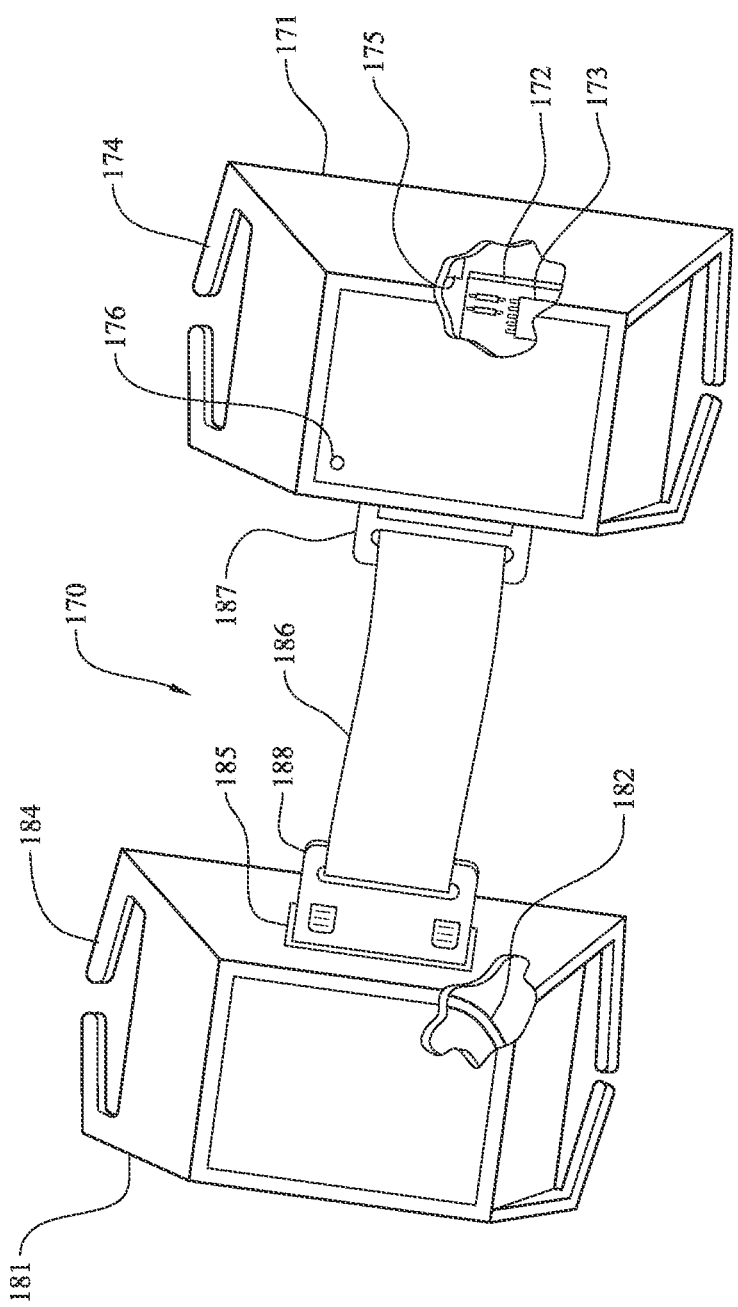
FIG. 7 presents a perspective view of the separable seat monitor with portions cut away to illustrate internal components.

As illustrated in FIG. 7, the seat monitor 170 has a first housing or magnet housing 181 for engaging a first of the restraining straps 23 of child seat 22, and a second housing or circuit housing 171 for engaging a second of the restraining straps 23 of child seat 22. The circuit housing 171 and the magnet housing 181 include a plurality of strap engagement tabs 174, 184 respectively for engaging the seat monitor 170 with the restraining straps 23 in a manner known in the art.

The circuit housing 171 encases a wireless transceiver 172 operable in transmit mode only and also incorporates an 8-bit microcontroller 173. The wireless transceiver 172 also includes a high frequency crystal and a low frequency crystal (not shown). The high frequency crystal is used during wireless communication while the low frequency crystal is used to maintain synchronization with the key fob 141 while in a low power state between wireless transmissions. The circuit housing 171 also contains a slide switch 175 for selectively enabling and disabling the seat monitor 170, and further includes a micro-switch (not shown) that is sensitive to a magnetic field and is integrated with wireless transceiver 172. A battery (also not shown) powers the transceiver 172, and a low power light emitting diode 176 provides a visual indication of the condition of the battery.

The magnet housing 181 is substantially identical to circuit housing 171 and encases a magnet 182 of a predetermined force and positionally mounted in magnet housing 181 similarly to transceiver 172 in circuit housing 171.

The circuit housing 171 and the magnet housing 181 are separably connected by a connecting strap 186. The connecting strap 186 is attached to an anchor fitting 187 on one of the circuit housing 171 and the magnet housing 181 and extends to a buckle 188 which is received in a receptacle 185 at the other of the circuit housing 171 and the magnet housing 181. As illustrated, buckle 188 and receptacle 185 are positioned at magnet housing 181, however, those practiced in the art will readily recognize that buckle 188 and receptacle 185 can be positioned at circuit housing 171 or that a buckle 188 and receptacle 185 can be incorporated at both the circuit housing 171 and the magnet housing 181.

The circuit housing 171 also includes a micro switch (not shown) that is sensitive to a magnetic field. When the circuit housing 171 and the magnet housing 181 are secured together with connecting strap 186, the micro switch in circuit housing 171 senses the magnetic field of the magnet 182 in magnet housing 181. When buckle 188 has been released from receptacle 185 and restraining straps 23 have been separated for the child 25 to be removed from the child seat 23, the magnetic field emitted by magnet 182 and sensed by the micro switch changes causing the micro switch to change states and send an interrupt signal to microcontroller 172 indicating that the circuit housing 171 and the magnet housing 181 have been separated one from the other. The microcontroller will then send a "disconnected" message to the key fob 141. The seat monitor 170 will then revert to a very low power mode until the micro switch again sensed the proximity of magnet 182 and again changes state to indicate that the circuit housing 171 and the magnet housing 181 are again connected by connecting strap 186.

Alternatively, circuitry (not shown but of known configuration) can be incorporated into strap 186 and buckle 188 that is communicative with transceiver 172 to determine whether the circuit housing 171 and the magnet housing 181 are interconnected by strap 186 or whether the circuit housing 171 and the magnet housing 181 have been separated one from the other (i.e. buckle 188 disengaged and removed from receptacle 185).

Figure 8:
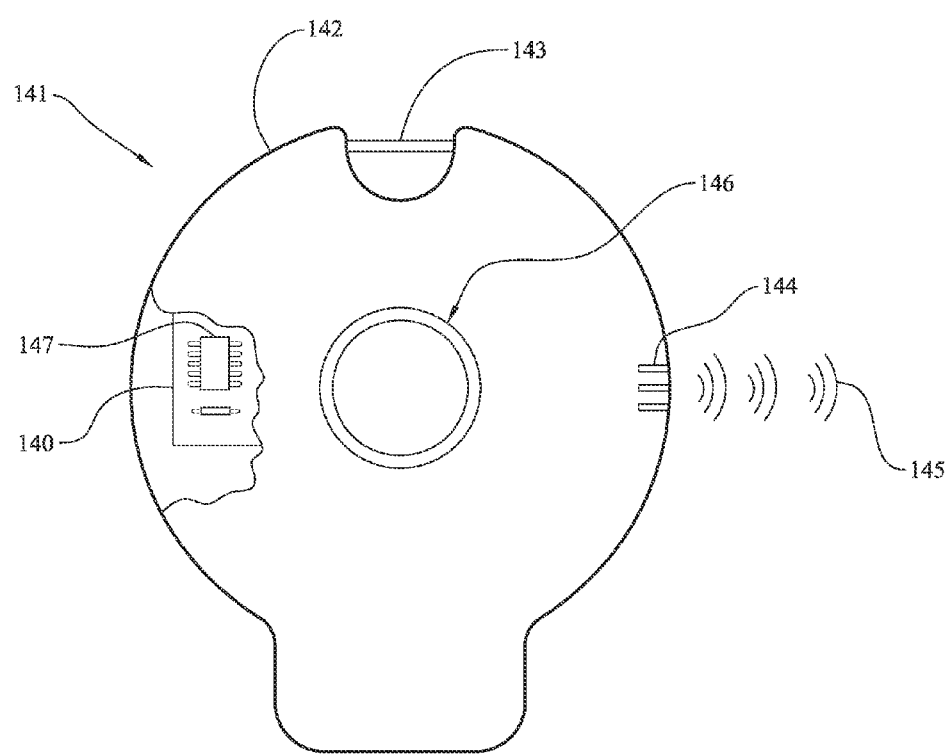
FIG. 8 presents a plan view of the key fob with a portion of the case cut away to illustrate internal components.

Referring now to FIG. 8, the key fob 141 is illustrated in greater detail. The key fob 141 includes a fob case 142 typically formed of a molded resin in a shape convenient for handling by child caregiver 50 and small enough to be carried in a pocket. The fob case 142 also includes a tether feature 143 to which a key ring can be removably attached for convenience. Housed within the fob case 142 is a wireless transceiver 140 operable in receive mode only. The wireless transceiver 140 typically operates in the 2.4 GHz range and also incorporates an 8-bit microcontroller 147. The wireless transceiver 140 also has a high frequency and a low frequency crystal (not shown). The high frequency crystal is used during wireless communication while the low frequency crystal is used to maintain synchronization with the seat monitor 170 or the wrist device 190 while in a low power state between wireless transmissions. The key fob 141 also includes a buzzer (not shown) positioned proximate to a sound port 144 that is used to generate an audible alarm 145 to alert the user when a message is not received from the seat monitor 170 or wrist device 190. Alternate audible warnings can be generated representing a low battery warning or any other need to alert a user. The key fob 141 is powered by a user replaceable primary lithium battery (not shown). A single tactile button 146 operable by the user provides a hardware input to the wireless transceiver 140. Operation of the tactile button 146 can be used to emulate a seat monitor 170 or a wrist device 190 disconnect if necessary and to aid in pairing the key fob 141 with the seat monitor 170 and the wrist device 190.

The key fob 141 also contains a vibration sensor that permits it to enter a lower power state if movement of the key fob 141 is not detected for a period of time. Also, included in the circuitry of transceiver 140 is a tilt and vibration sensor (also not shown). The sensor is omnidirectional so it will detect movement along any axis of the key fob 141. The output of the vibration sensor is a digital signal that appears as a normally closed switch. When motion is detected the output of the sensor will toggle on and off appearing as a train of pulses. The microcontroller 147 will monitor this input for any indication of detected motion. The microcontroller will keep track of how long it has been since movement was last detected. If the elapsed time period exceeds a predetermined limit the Key Fob will go into a lower power state until movement is again detected. This will conserve battery life when the key fob 141 appears to not be in use. Once movement is detected, the key fob 141 will return to normal operation and regularly check for transmissions from a seat monitor 170 or a wrist device 190. If the elapsed period of time between points of motion detection never reaches the predetermined limit, the key fob 141 will always be in a state of normal operation.

Figure 9:
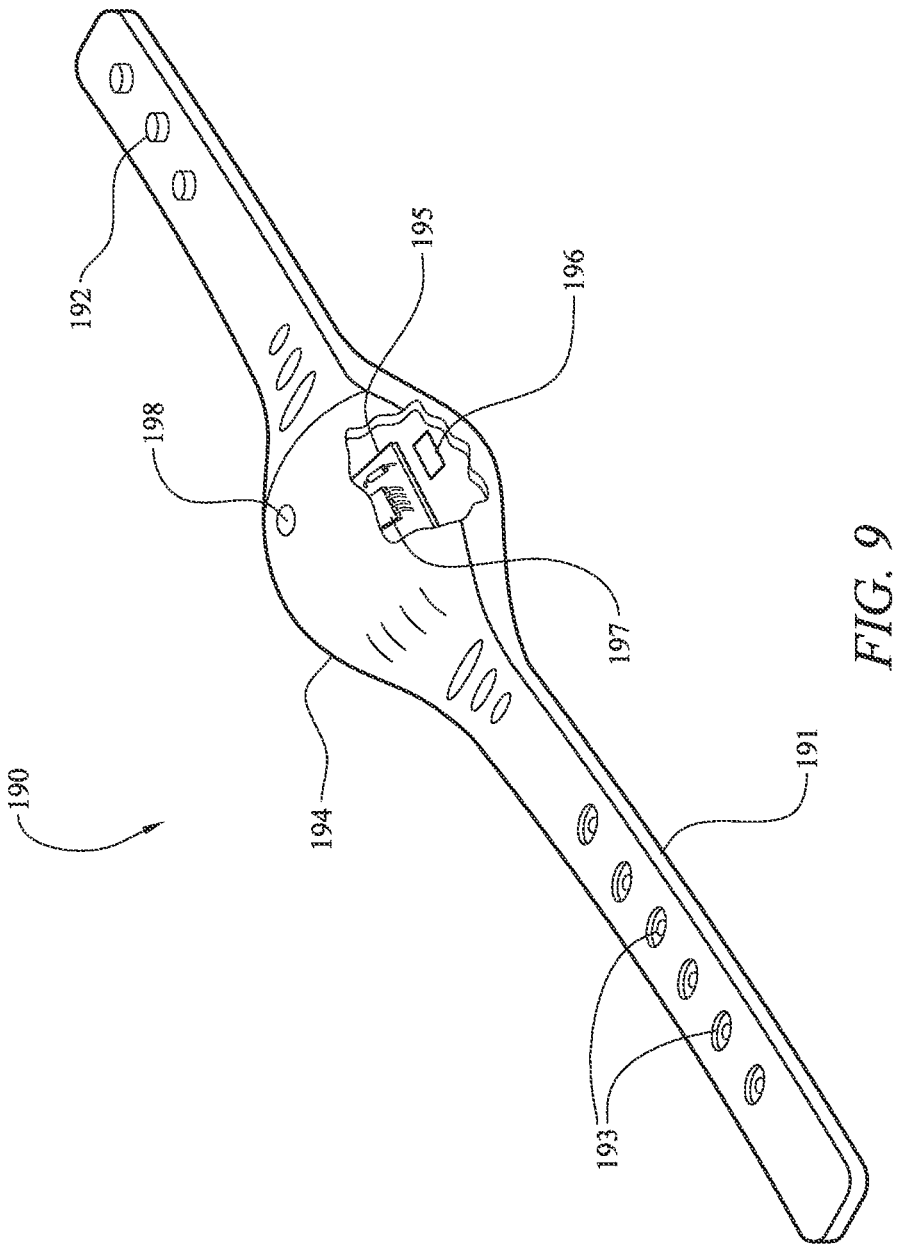
FIG. 9 presents a perspective view of a wrist device as an alternative device to the seat monitor for use outside a vehicle for monitoring a child.

As illustrated in FIG. 9 a wrist device 190 can also be utilized to monitor whether a child is within a predetermined distance of the key fob 141. The wrist device 190 is constructed similar to a wristwatch and scaled to fit a child's arm or wrist. The wrist device includes a strap 191 that includes at one end thereof, one or more male fastening elements 192 thereon. A plurality of female fastening elements or receptacles 193 a positioned in a regularly spaced manner at an opposite end of the strap 191 to enable the wrist device 190 to be sized according to the size of the child to be monitored. A case 194 is substantially centrally located along the strap 191 and houses therein a transceiver 195 including a microcontroller 197 identical in function to transceiver 172 of seat monitor 170. The wrist device 190 is powered by a user replaceable battery (not shown) and the condition of the battery is communicated to the user by a low power light emitting diode indicator light 198.

The wrist device 190 further includes a slide switch 196 on a back of case 194 such that when the wrist device 190 is worn by a child, slide switch 196 bears against the arm of the child and is inaccessible to the child 25 to prevent the child 25 from manually disabling wrist device 190. In one position, slide switch 196 will emulate the micro switch output of the seat monitor 170 as if circuit housing 171 and the magnet housing 181 are interconnected by connecting strap 186. When slide switch 196 is translated to a second state, slide switch 196 will emulate the micro switch output of the seat monitor 170 as if the circuit housing 171 and the magnet housing 181 have been separated one from the other whereupon wrist device 190 will cease transmitting.

In use, and again referring to FIGS. 5-6, a user or child caregiver 50 wishing to take child 25 on a car trip buckles child 25 into child seat 22. While the specific arrangement of restraints for child 25 may vary depending on the specific model of child seat, each child seat typically includes a pair of shoulder straps 23 which are affixed to a seat belt 24 and are engaged to restrain the child 25 at one or more latches 21. A seat monitor 170 is integrally attached to shoulder straps 23 wherein circuit housing 171 and the magnet housing 181 have strap engagement tabs 174, 184 respectively holding circuit housing 171 and the magnet housing 181 captive to shoulder straps 23. User 50 possessing a key fob 141 translates slide switch 175 on circuit housing 171 to enable seat monitor 170 in an operational mode. The user then presses the tactile button 146 on the key fob 141 to pair the key fob 141 with the seat monitor 170. Once pairing has occurred wirelessly between key fob 141 and seat monitor 170, the key fob 141 emits an audible signal 145 so signifying to the user 50. Since circuit housing 171 and the magnet housing 181 are connected one to the other with connecting strap 186, the micro switch of circuit housing 171 senses the presence of magnet 182 in the magnet housing 181 and is then actuated to enable the seat monitor 170.

Upon activation, the seat monitor transmits via transceiver 172 a "connected" signal indicating that a child is secured in child seat 22. The key fob 141 also determines that the seat monitor 170 is within a predefined radius "D" (FIG. 5) of key fob 141. Key fob 141 at regular intervals samples for messages from seat monitor 170 and providing that a "connected" message is received from seat monitor 170 and the radial distance between the key fob 141 and the seat monitor 170 is within the radius "D" key fob 141 remains silent. Upon arrival at a destination, user 50 unbuckles child 25 from child seat 23 including disengaging the buckle 188 from the receptacle 185 and thereby separating the circuit housing 171 from the magnet housing 181. The separation of the circuit housing 171 and the magnet housing 181 causes a change in the state of the micro switch in circuit housing 171 which in turn causes the seat monitor to become disabled. The user 50 can then take the child 25 from the car without triggering a warning.

However, should user 50 inadvertently forget to remove child 25 from child seat 22, seat monitor 170 continues to transmit the "connected" message to key fob 141. When user 50 walks beyond the predefined distance "D" from seat monitor 170, and key fob 141 determines that distance "D" has been exceeded, key fob 141 will emit an audible alarm 145 to remind user the he/she has left child 25 in vehicle 60. User 50 can then return to vehicle 60 to retrieve child 25.

Similarly, wrist device 190 can be substituted for seat monitor 170 and function in a like manner. Prior to engaging wrist device 190 on the wrist of child 25, the user 50 activates switch 196 to place wrist device 190 in the "connected" mode whereupon the wrist device 190 commences sending the "connected" message. In the event that user 50 and child 25 become separated by greater than distance "D", the key fob 141 will sense the excess distance in combination with the "connected" message and issue audible alarm 145. In this manner, user 50 can immediate begin search for the child 25 while child 25 is still close enough to be readily located. Once the use of wrist device 190 is no longer desired to be used, the user 50 can remove wrist device from the child 25 and change the state of slide switch 196 thereby disabling wrist device 190.

The wrist device 190 provides protection of the child 25 that differs from the protection provided by the seat monitor 170. The wrist device 190 provides a warning to the user 50 when the user 50 and the child 25 have been separated in any condition or environment. The cause of this distance could be due to various reasons:

A) Child that strays away from his mother or guardian. One example that would create this scenario is a curious child 25 that wanders off and loses track of their parent(s) 50. It is know that this happens at malls, toy stores, pet stores, amusement/theme parks (such as Disney World, Universal Studios, Six Flags, Great America, and the like), zoos, parks, sporting events, and the like.

B) A parent 50 that accidentally wonders away from their child 25. This scenario occurs when the parent 50 is distracted and veers away from a location, leaving the child 25 at that location. The child generally tries to find the parent 50 and becomes separated therefrom. This is including but not limited to airports, supermarkets, department stores, shopping malls, and the like.

C) Where a child 25 is lured away from the parent 50 or location by a stranger. This scenario commonly involves where a child 25 ends up missing or abducted.

D) Where a child is accidentally left behind by a parent or caretaker, such as in a vehicle, store, workplace, and the like. This scenario occasional occurs and is generally a result of a parent being distracted.

E) Acting as an aid in an environment where a parent 50 wants to keep a close eye on the child 25. Examples include heavily traffic areas such as malls, amusement parks, and the like; in an environment where the parent 50 may become distracted such as sporting events, and the like.

F) Tracking an elderly person who is diagnosed with a mental disorder such as Dementia or Alzheimer's.

G) Monitoring/tracking objects such as purses, luggage, or bags to make sure the user 50 doesn't leave the object behind or to let the user 50 know if someone was trying to take the object.

G) Monitoring/tracking baby strollers to make sure the stroller has not been separated from the user 50 or been taken with the user's child/baby 25 placed therein.

H) Retaining groups of people together, such as multiple children, school children, campers, bike riders, and the like. For example, the system can link a plurality of wrist devices 190 to a single key fob 141 or other monitoring unit.

Alternatively, seat monitor 170 can be paired with other vehicle sensors to trigger an alarm instead of being paired with key fob 141 and relying on triggering the alarm 145 in the key fob 141. Referring again to FIGS. 6-7, the transceiver 172 can here be operable in both transmit and receive modes. The microcontroller 173 can receive via transceiver 172 one or more of a variety of sensed parameters relating to the vehicle. If one or more of these sensed parameters are sensed as present in combination with seat monitor 170 being in an enabled mode, i.e. the micro switch sensing proximity of magnet 182 or the strap buckle 188 being engaged in receptacle 185, and slide switch 175 in an "enable" position, then an alarm signal can be transmitted to the vehicle to generate a sensory alarm perceivable to a responsible individual. Such a sensory alarm can include rapid beeping of the vehicle's horn or flashing of the vehicle's light or both. Parameters of the vehicle which may be transmitted to seat monitor 170 to aid in determining whether to trigger an alarm can include (but not be limited to) compression for lack thereof) of the driver's seat, position of the ignition key, disengagement of driver's seat belt, engagement of door locks, or sensing that the vehicle is stationary for a predefined period of time. One or a combination of these parameters, in combination with the "connected" signal, can be determined by microcontroller 173 in execution of a predefined instruction set to be grounds for activating the alarm sequence.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. A wireless child proximity monitoring and alarm system for use with child seats for vehicles wherein the child seat includes shoulder straps for restraining the child, said monitoring and alarm system comprising:
   a separable seat monitor for affixation to the child seat shoulder straps, said seat monitor including:
      a first housing affixable to a first of the child seat shoulder straps;
      a second housing affixable to a second of the child seat shoulder straps and having a transceiver for wireless communication and a microcontroller integrated with said transceiver, and further including a micro switch communicative with said microcontroller and responsive to the proximity of said first housing; and
      a connecting strap extending between said first housing and said second housing, said connecting strap separable from at least one of said first housing and said second housing; and
   a key fob for retention by a child caregiver, said key fob including:
      a fob case;
      a transceiver housed within said fob case for wireless communication with said seat monitor transceiver;
      a microcontroller integrated with said transceiver; and
      an alarm selectively operable between a first silent sate and a second audible alarm generating state.

2. The monitoring and alarm system according to claim 1 wherein said second housing includes a slide switch interconnected with said transceiver and said microcontroller therein and mounted on a bottom of said first housing for selectively enabling and disabling said seat monitor.

3. The monitoring and alarm system according to claim 1 wherein said connecting strap includes a buckle at an end proximate to said first housing and further wherein said second housing includes a receptacle for releaseably receiving said connecting strap buckle.

4. The monitoring and alarm system according to claim 3 wherein said seat monitor microcontroller is responsive to said buckle being engaged in said receptacle and causes a "connected" signal to be broadcast by said seat monitor transceiver when said buckle is engaged in said receptacle and further wherein said key fob transceiver is responsive to said first signal.

5. The monitoring and alarm system according to claim 4 wherein said key fob emits and audible alarm when a predetermined physical distance between said key fob and said seat monitor is exceeded and when said key fob concurrently receives said "connected" signal.

6. The monitoring and alarm system according to claim 1 wherein said first housing includes a magnet retained therein, and further wherein said micro switch is responsive to a magnetic field.

7. The monitoring and alarm system according to claim 6 wherein said microcontroller causes a "connected" signal to be broadcast by said seat monitor transceiver when said micro switch senses said magnet and further wherein said key fob transceiver is responsive to said first signal.

8. The monitoring and alarm system according to claim 7 wherein said key fob emits and audible alarm when a predetermined physical distance between said key fob and said seat monitor is exceeded and when said key fob concurrently receives said "connected" signal.

9. The monitoring and alarm system according to claim wherein said seat monitor transceiver is operable as a transmitter only, and further wherein said key fob transceiver is operable as a receiver only.

10. A wireless seat monitor for use with child seats for vehicles wherein the child seat includes shoulder straps for restraining the child, said seat monitor comprising:
   a first housing affixable to a first of the child seat shoulder straps;
   a second housing affixable to a second of the child seat shoulder straps and having a transceiver for wireless communication and a microcontroller integrated with said transceiver, and further including a micro switch communicative with said microcontroller and responsive to the proximity of said first housing; and
   a connecting strap extending between said first housing and said second housing, said connecting strap separable from at least one of said first housing and said second housing.

11. The wireless seat monitor according to claim 10 wherein said second housing includes a slide switch interconnected with said transceiver and said microcontroller therein and mounted on a bottom of said first housing for selectively enabling and disabling said seat monitor.

12. The wireless seat monitor according to claim 10 wherein said connecting strap includes a buckle at an end proximate to said first housing and further wherein said second housing includes a receptacle for releaseably receiving said connecting strap buckle.

13. The wireless seat monitor according to claim 12 wherein said seat monitor microcontroller is responsive to said buckle being engaged in said receptacle and causes a "connected" signal to be provided to said microcontroller when said buckle is engaged in said receptacle.

14. The wireless seat monitor according to claim 13 wherein said microcontroller functions according to a predefined instruction set to determine in combination with said "connected" signal and at least one vehicle parameter that a child has been left alone in a vehicle and to trigger an alarm sequence when said determination is made.

15. The wireless seat monitor according to claim 10 wherein said first housing includes a magnet retained therein, and further wherein said micro switch is responsive to a magnetic field.

16. The wireless seat monitor according to claim 15 wherein said microcontroller causes a "connected" signal to be provided to said microcontroller when said micro switch senses said magnet.

17. The wireless seat monitor according to claim 16 wherein said microcontroller functions according to a predefined instruction set to determine in combination with said "connected" signal and at least one vehicle parameter that a child has been left alone in a vehicle and to trigger an alarm sequence when said determination is made.

18. A method of determining to trigger an alarm alerting a user that a child has been left unattended in a vehicle wherein the child is buckled in a child seat having affixed thereto a wireless seat monitor wherein the wireless seat monitor is of the type having a first housing affixed to a first of the child seat shoulder straps, a second housing affixed to a second of the child seat shoulder straps, the second housing having a transceiver for wireless communication and a microcontroller executing a predefined instruction set and integrated with the transceiver, and further having a micro switch communicative with the microcontroller and responsive to the proximity of the first housing, and a connecting strap extending between the first housing and the second housing, wherein the connecting strap is separable from at least one of the first and second housings, the method comprising the steps:
   receiving from the micro switch a "connected" signal signifying that the connecting strap is engaged with both the first housing and the second housing;
   receiving from the vehicle at least one other parameter signifying that the vehicle is potentially unoccupied other than the child in the child seat; and
   triggering a sensory alarm when the "connected" signal and the vehicle parameter are present.

19. The method according to claim 18 wherein the vehicle parameter received is at least one of the parameters selected from the group of absence of compression of the driver's seat, position of the ignition key, disengagement of driver's seat belt, engagement of door locks, and sensing that the vehicle is stationary for a predefined period of time.

20. The method according to claim 18 including after the triggering step, the step of: disabling the triggered alarm when the connecting strap is disengaged from at least one of the first and second housings.

* * * * *